United States Patent
Nakaoka et al.

(10) Patent No.: US 10,989,579 B2
(45) Date of Patent: Apr. 27, 2021

(54) THERMAL DETECTION SENSOR

(71) Applicant: MITSUBISHI ELECTRIC CORPORATION, Tokyo (JP)

(72) Inventors: Yui Nakaoka, Tokyo (JP); Takaki Sugino, Tokyo (JP); Shinichi Hosomi, Tokyo (JP); Yuji Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/260,562

(22) Filed: Jan. 29, 2019

(65) Prior Publication Data
US 2019/0265089 A1   Aug. 29, 2019

(30) Foreign Application Priority Data

Feb. 23, 2018   (JP) .............................. JP2018-030342

(51) Int. Cl.
| | | |
|---|---|---|
| *G01F 1/69* | (2006.01) | |
| *G01F 1/692* | (2006.01) | |
| *G01F 1/698* | (2006.01) | |

(52) U.S. Cl.
CPC .............. *G01F 1/692* (2013.01); *G01F 1/698* (2013.01)

(58) Field of Classification Search
None
See application file for complete search history.

(56) References Cited

U.S. PATENT DOCUMENTS

| | | |
|---|---|---|
| 5,852,307 A | 12/1998 | Aoyama et al. |
| 6,156,599 A | 12/2000 | Aoyama et al. |
| 6,349,596 B1 * | 2/2002 | Nakada ................ G01F 1/6845 73/204.15 |

(Continued)

FOREIGN PATENT DOCUMENTS

| | | |
|---|---|---|
| EP | 2 801 803 A1 | 11/2014 |
| JP | 05-7659 B2 | 7/1985 |

(Continued)

OTHER PUBLICATIONS

Suppression of silicidation and crystallization by atmosphere controlled annealing for polycrystalline silicon/ gate stack structures, Takahashi, H. et al. (2007).*

(Continued)

*Primary Examiner* — Harshad R Patel
(74) *Attorney, Agent, or Firm* — Sughrue Mion, PLLC; Richard C. Turner

(57) ABSTRACT

In order to achieve at least one of size reduction and high accuracy by maintaining the reliability of the thermal detection sensor in the thermal detection sensor in the flow state of the fluid to be detected, based on a heat transfer amount from the heating resistor element to the fluid to be detected by heat exchange between the fluid to be detected and the heating resistor element via the flattened film, the thermal type detection sensor for detecting a flow state of the fluid to be detected, and wherein a sidewall covering a sidewall of the heating resistor element and blocking physical contact between the heating resistor element and the flattened film is provided between the heating resistor element and the flattened film, and the sidewall suppresses fluctuation in electric resistance of the heating resistor element due to silicidation of the heating resistor element.

10 Claims, 9 Drawing Sheets

(56) References Cited

U.S. PATENT DOCUMENTS

| | | | | |
|---|---|---|---|---|
| 6,354,150 | B1* | 3/2002 | Rudent | G01F 1/6847 73/202.5 |
| 6,983,653 | B2* | 1/2006 | Iwaki | G01F 1/692 73/204.23 |
| 7,049,556 | B2* | 5/2006 | Aoki | H05B 3/265 219/538 |
| 8,161,811 | B2* | 4/2012 | Beck | G01F 1/6845 73/204.26 |
| 2004/0025585 | A1* | 2/2004 | Seki | G01F 1/692 73/204.26 |
| 2004/0090305 | A1* | 5/2004 | Taguchi | G01K 1/16 338/25 |
| 2004/0262709 | A1* | 12/2004 | Yamashita | H01C 7/006 257/516 |
| 2007/0186643 | A1* | 8/2007 | Speldrich | G01F 1/6845 73/204.26 |
| 2008/0188027 | A1* | 8/2008 | Fukami | G01F 1/6845 438/54 |
| 2009/0174757 | A1* | 7/2009 | Sako | B41J 2/3353 347/203 |
| 2010/0139391 | A1* | 6/2010 | Sakuma | G01F 5/00 73/204.26 |
| 2011/0107832 | A1* | 5/2011 | Sakuma | G01F 1/6842 73/204.26 |
| 2014/0284753 | A1* | 9/2014 | Ishitsuka | G01F 1/692 257/467 |

FOREIGN PATENT DOCUMENTS

| | | |
|---|---|---|
| JP | 9-102591 A | 4/1997 |
| JP | 2004-156988 A | 6/2004 |
| JP | 3598217 B2 | 12/2004 |
| JP | 3699703 B2 | 9/2005 |
| JP | 2014-6052 A | 1/2014 |

OTHER PUBLICATIONS

Communication dated Mar. 5, 2019 from the Japanese Patent Office in counterpart application No. 2018-030342.

Communication dated Oct. 1, 2019, from the Japanese Patent Office in application No. 2018-030342.

Communication dated Mar. 2, 2021, issued by the Japanese Patent Office in application No. 2019-233799.

* cited by examiner

THERMAL DETECTION SENSOR

TECHNICAL FIELD

The present application relates to a thermal detection sensor which detects the flow state of a fluid to be detected, as a flow rate detection of a fluid to be detected and a flow velocity detection, based on an heat transfer quantity from the heating resistor element to a fluid to be detected, according to a heat exchange of the fluid to be detected and a heating resistor element.

BACKGROUND ART

In a conventional detection sensor that detects the flow state of a fluid to be detected, the sensor detects the state of a fluid to be detected of the velocity and the flow rate of a fluid to be detected like a liquid and a gas, according to the measurement principle, the detectable fluid to be detected is different. The sensor that detects the flow state of the fluid to be detected is referred hereinafter as "flow sensor" for convenience.

For example, as a liquid flow rate sensor, an electromagnetic sensor, a Karman vortex type sensor, or an impeller type sensor are used. On the other hand, as the gas flow rate sensor, a Karman vortex type sensor, an impeller type sensor, and a thermal type sensor are used.

Among the flow rate sensors, a thermal type flow rate sensor has been widely used for detecting an amount of intake air (fluid to be detected) of an internal combustion engine in the related art.

Here, the measurement principle of the thermal type flow rate sensor will be described.

In the case where the heating resistor element heated by flowing an electric current is placed in the fluid to be detected, the amount of heat lost from the heating resistor element in a unit time, in other words, the cooling amount depends on the speed of the fluid to be detected.

The thermal type flow rate sensor uses a substantially primary functional relation established between the flow velocity or the flow rate of the fluid to be detected and the heat transfer amount from the heating resistor disposed in the fluid to be detected to the fluid to be detected, and the flow velocity or the flow rate of the fluid to be detected based on the heat transfer amount is detected.

A metal conductor having a high melting point such as platinum (Pt) is usually used as the heating resistor element. The metal conductor has a positive temperature coefficient in which the electric resistance increases in proportion to the temperature.

In the detection method called the constant temperature difference method, this property, in other words the property in that the electric resistance increases in proportion to the temperature is used, the temperature difference between the temperature of the metal conductor and the temperature of the fluid to be detected is kept constant so as to control the heating current. This heating current is replaced with a voltage and output as a voltage signal. Since the output voltage signal has a substantially primary functional relation with the flow velocity or the flow rate of the fluid to be detected, by monitoring the voltage signal, it is possible to detect the flow velocity or the flow rate of the fluid to be detected, in other words the flow state can be detected.

For an in-vehicle flow sensors that measure the amount of intake air to the internal combustion engine, the car manufacturer's requirements for severe low electric power consumption and high responsiveness are met, moreover, there was a demand to develop a new type of sensor capable of achieving a significant reduction in size as compared with the conventional type. Therefore, a flow rate sensor adopting the micromachining technology of semiconductor manufacturing has been developed.

By this method of forming a very small diaphragm structure of several millimeters square at once in a silicon wafer, mass production of flow rate detection sensor became possible. In addition, by forming a very thin diaphragm structure with high precision by thin film coating technology and etching technology, thermal insulation is improved and heat capacity is reduced, electric power consumption and responsiveness are rapidly improved.

For example, the thermal type flow rate detection sensor disclosed in Patent Document 1 is configured as follows. The structure will be explained below.

An insulating supporting film made of a silicon nitride film (SiN), a heating resistor made of permalloy (an alloy of iron and nickel), and a temperature measuring resistor are formed on a flat plate substrate made of a silicon semiconductor. A protective film made of a silicon nitride film (SiN) is formed thereon.

An air space is provided in the flat plate substrate in the vicinity of the deposition part of the heating resistor element and the temperature measuring resistor, forming a bridge structure. The air space is formed by removing a part of the silicon semiconductor from the opening part by using an etching solution which does not damage the silicon nitride. The temperature measuring resistor is arranged in a plane direction in the direction of the flow of the measured fluid across the heating resistor element.

In such a conventional flow rate detection sensor, a protective film is formed on a step formed by wiring of a heat sensitive resistive film (heating resistor element, temperature measuring resistor). When an external force is applied to this protective film, stress concentration occurs at the corner part of the step at the outermost surface of the protective film. Cracks tend to occur in the protective film starting from stress concentration occurring at the outermost surface. If the protective film cracks, the strength of the diaphragm structure may decrease. Furthermore, when moisture in the atmosphere enters from the cracks, it is possible that the resistance value variation, corrosion, etc. of the heat sensitive resistive film (heating resistor element, temperature measuring resistor) occur.

In the thermal type flow rate detection sensor described in Patent Document 2, the occurrence of cracks in the protective film is suppressed by using a flattened film. The structure will be explained below.

In order to protect an insulating supporting film made of a thermal oxide film (th-$SiO_2$) and a silicon nitride film (SiN), a heating resistor element made of platinum (Pt), and a heating resistor element on a supporting substrate made of a silicon wafer and an insulating film made of a silicon nitride film (SiN) are formed on the surface of the semiconductor substrate. Thereafter, a flattened film made of SOG (Spin-On-Glass) and a protective film made of a silicon nitride film (SiN) is formed.

The flattened film smooths or reduces the step generated in the heating resistor element to reduce the stress concentration of the protective film at the corner part of the step. As a result, occurrence of cracks in the protective film can be suppressed when an external force is applied.

However, when a Si-rich silicon nitride film (SiN) which is a tensile stress is used to obtain a bridge or a diaphragm structure, there is a problem that long-term reliability of output characteristics cannot be obtained in a heat generating structure formed by sandwiching heating resistor in a supporting film and a protective film formed of the Si-rich silicon nitride film (SiN). This is because silicidation progresses at the interface between the Si-rich silicon nitride film (SiN) and the heating resistor element (Pt), and the resistance value gradually changes.

In the thermal flow rate detection sensor described in Patent Document 3, by setting the index of refraction of the silicon nitride film (SiN) of less than 2.25, while maintaining the tensile stress, the surplus Si of the silicon nitride film (SiN) is reduced, thereby the silicidation of the heating resistor element which causes the resistance value to rise is suppressed.

However, the SOG used as a flattened film contains Si. Silicidation of the metal occurs due to the reaction between the metal and Si, so it is necessary to consider silicidation due to SOG when downsizing.

As described above, in the structure of Patent Documents 1 to 3, technical improvement has been made in several respects, but regarding the downsizing required as the current sensor, each structure has a problem in each.

PRIOR ART DOCUMENT

Patent Literature

[Patent Literature 1]: JPH05-007659 B2
[Patent Literature 2]: JP 3598217 B2
[Patent Literature 3]: JP 3699703 B2

SUMMARY OF INVENTION

Technical Problem

In order to reduce the size and cost of the flow rate sensor, there is a method of narrowing the wiring width of the heating resistor element. For this reason, the change in resistance value of the heating resistor element which has been allowed in the flow rate detection sensor of the conventional bridge type and diaphragm structure type cannot be ignored, and the problem that the characteristics fluctuate (drift) becomes obvious.

This will be described with reference to the drawings. FIG. 5 is a plan view showing a main part of a thermal type flow rate detection sensor. FIG. 6 is a sectional view of a conventional flow rate detection sensor having a large wiring width. On the other hand, FIG. 7 is a cross-sectional view of the flow rate detection sensor in which the wiring width has become narrowed due to downsizing.

A silicide layer 601 is formed at the interface between the heating resistor element and the flattened film.

The resistance value increase rate (=amount of change in resistance value ΔR/initial resistance value R) by silicidation at the interface between the heating resistor element and the wiring width (X) of the heating resistor element and the flattened film was calculated.

There is a correlation of $X^{-1}$ between the wiring width (X) of the heating resistor element and the resistance increase rate due to silicidation at the interface between the heating resistor element and the flattened film. In other words, as the wiring width (X) of the heating resistor element decreases, the resistance value of the heating resistor element varies greatly even with slight silicidation.

For example, when the wiring width (X) of the heating resistor element shown in FIGS. 6 and 7 is reduced from 200 μm to 10 μm, the rate of resistance increase due to silicidation is about 20 times.

There arises a problem that the long-term reliability of the flow rate sensor deteriorates due to fluctuation of the resistance value of the heating resistor element. A decrease in long-term reliability means that a value different from the true value is calculated for the detected flow rate as time elapses due to the resistance value fluctuation. When such a flow rate sensor is applied to the detection of the intake air amount of the internal combustion engine in the vehicle driven by the internal combustion engine, it affects the air-fuel ratio control of the vehicle, and there is a possibility that the fuel consumption is deteriorated.

In the above-described circumstances, the present application has made it possible to attain at least one of downsizing and high accuracy by maintaining the reliability of a thermal type detection sensor in a thermal detection sensor of a flow state of a fluid to be detected.

Solution to Problem

A thermal detection sensor in the present application is a thermal detection sensor having an insulating supporting film, a heat heating resistor element made of a metal provided on the supporting film, and a flattened film formed so as to cover the heating resistor element and made of SOG for flattening the step between the supporting film and the heating resistor element on its surface on the side of a fluid to be detected, wherein based on a heat transfer amount from the heating resistor element to the fluid to be detected by heat exchange between the fluid to be detected and the heating resistor element via the flattened film, the thermal type detection sensor for detecting a flow state of the fluid to be detected, and wherein a barrier film for blocking physical contact between the heating resistor element and the flattened film is provided between the heating resistor element and the flattened film, and the variation in electric resistance of the heating resistor element due to silicidation of the heating resistor element is suppressed by the barrier film.

Further, a thermal detection sensor in the present application is a thermal detection sensor having an insulating supporting film, a heat heating resistor element made of a metal provided on the supporting film, and a flattened film formed so as to cover the heating resistor element and made of SOG for flattening the step between the supporting film and the heating resistor element on its surface on the side of a fluid to be detected, wherein based on a heat transfer amount from the heating resistor element to the fluid to be detected by heat exchange between the fluid to be detected and the heating resistor element via the flattened film, the thermal type detection sensor for detecting a flow state of the fluid to be detected, and wherein a layer of an oxide film formed by reforming the surface of the heating resistor element is provided between the heating resistor element and the flattened film, and the layer of the oxide film suppresses the variation in the electric resistance of the heating resistor due to silicidation of the heating resistor element.

Furthermore, a thermal detection sensor in the present application is a thermal detection sensor having an insulating supporting film, a heat heating resistor element made of a metal provided on the supporting film, and a flattened film formed so as to cover the heating resistor element and made of SOG for flattening the step between the supporting film and the heating resistor element on its surface on the side of a fluid to be detected, wherein based on a heat transfer amount from the heating resistor element to the fluid to be detected by heat exchange between the fluid to be detected and the heating resistor element via the flattened film, the thermal type detection sensor for detecting a flow state of the fluid to be detected, and wherein a sidewall covering a sidewall of the heating resistor element and blocking physical contact between the heating resistor element and the flattened film is provided between the heating resistor element and the flattened film, and the sidewall suppresses fluctuation in electric resistance of the heating resistor element due to silicidation of the heating resistor element.

Advantageous Effects of Invention

In the thermal detection sensor disclosed in the present application, since an insulating supporting film, a heating resistor element made of a metal provided on the supporting film, and a heat generating resistor formed so as to cover the heating resistor element, a flattened film made of SOG for flattening the step between the supporting film and the heat generating resistor on its surface on the side of the fluid to be detected, based on a heat transfer amount from the heating resistor element to the fluid to be detected by heat exchange between the fluid to be detected and the heating resistor element via the flattened film, a thermal type detection sensor for detecting a flow state of the fluid to be detected, As a barrier film for blocking physical contact between the heating resistor element and the flattened film is provided between the heating resistor element and the flattened film, the variation in electric resistance of the heating resistor element due to silicidation of the heating resistor element is suppressed by the barrier film, further, since a layer of an oxide film formed by reforming the surface of the heating resistor element is provided between the heating resistor element and the flattened film, and the layer of the oxide film suppresses the variation in the electric resistance of the heating resistor due to silicidation of the heating resistor element, and furthermore, since a sidewall covering a sidewall of the heating resistor element and blocking physical contact between the heating resistor element and the flattened film is provided between the heating resistor element and the flattened film, and the sidewall suppresses fluctuation in electric resistance of the heating resistor element due to silicidation of the heating resistor element, it is possible to achieve at least one of size reduction and high accuracy by maintaining the reliability of the thermal detection sensor in the thermal detection sensor in the flow state of the fluid to be detected.

DESCRIPTION OF EMBODIMENTS

Hereinafter, an embodiment of a thermal detection sensor in a flow state of a fluid to be detected of the present application will be described with reference to the drawings. Note that the present application is not limited to the following description. In addition, in the following drawings, for easy understanding, the scales of the respective members may be different from the actual scales, and illustration of configurations not related to the features of the present application is omitted.

First Embodiment

Figure 1:
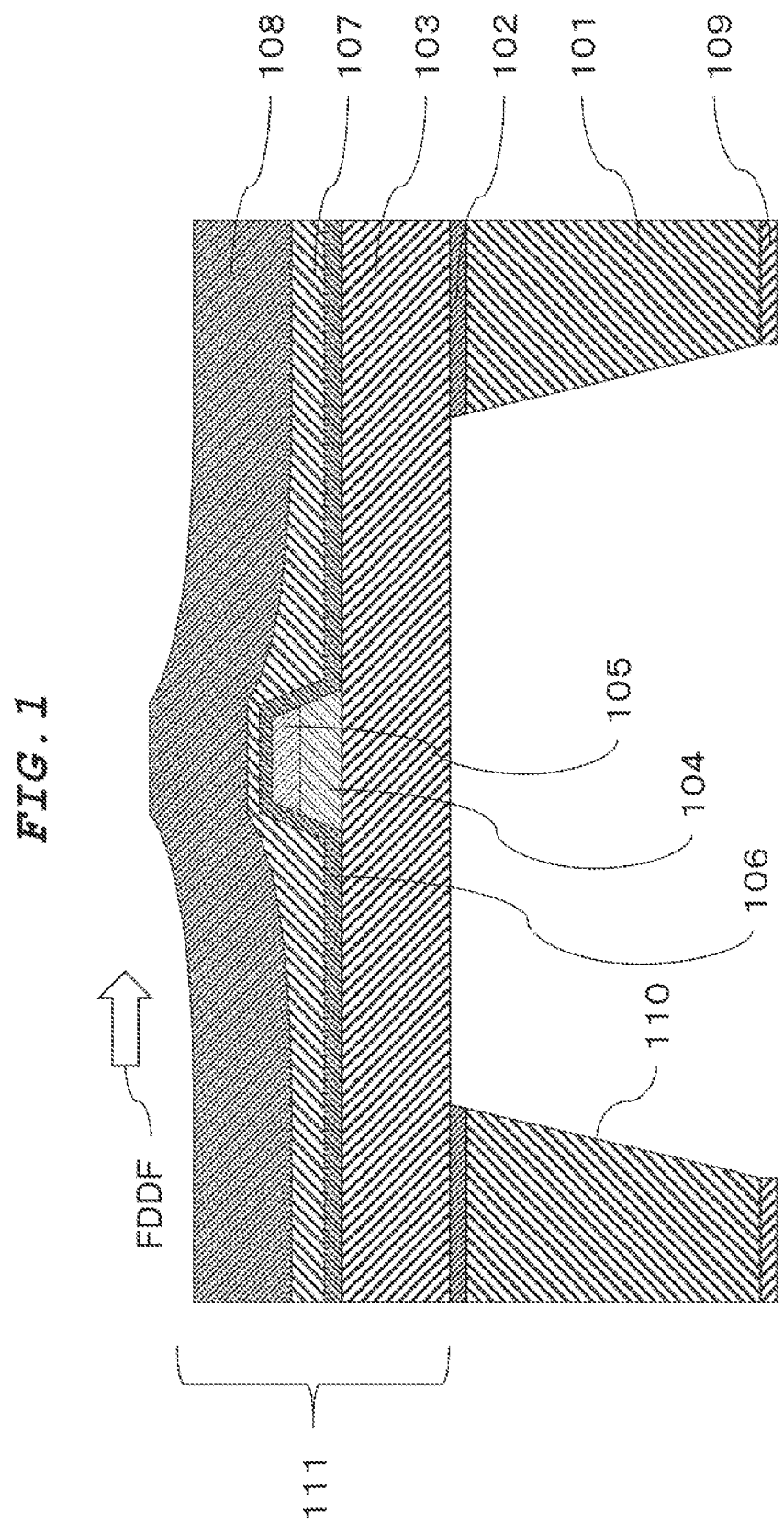
FIG. 1 is a cross-sectional view showing a first embodiment of the present application, showing an example of a main part of a thermal detection sensor for detecting a flow state of a fluid to be detected.
Figure 5:
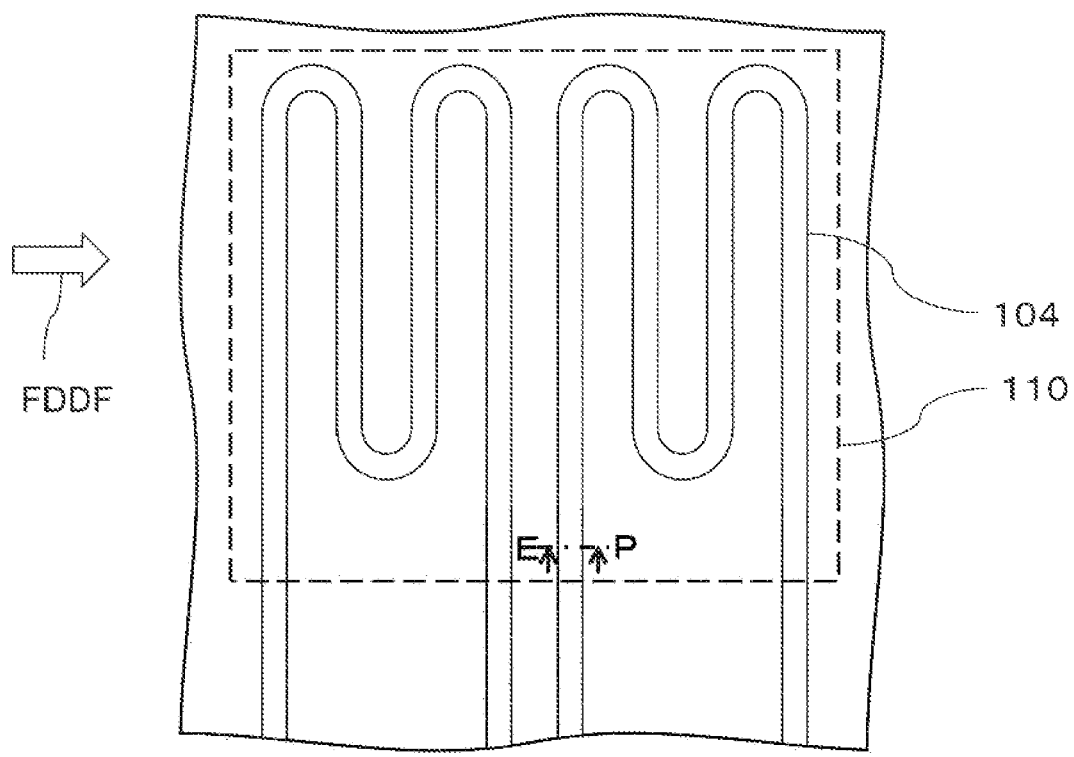
FIG. 5 is a plan view showing a thermal detection sensor for detecting a flowing state of a fluid to be detected, which is commonly used for the first to fourth embodiments of the present application and conventional art.
Figure 6:
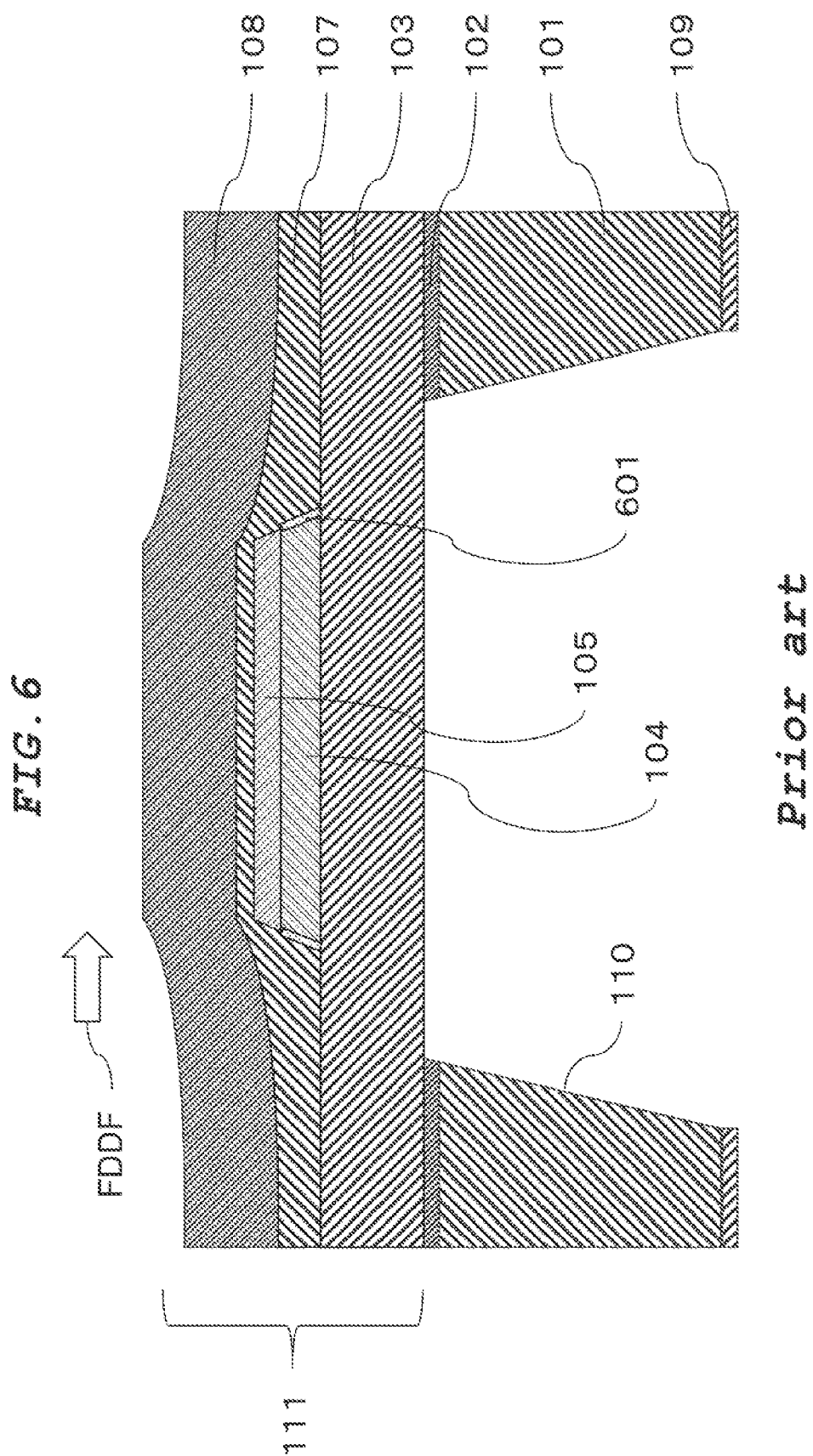
FIG. 6 is a cross-sectional view showing a main part of a conventional thermal type detection sensor which is a comparative example.

The first embodiment of the present invention will be described below with reference to FIG. 1. FIG. 1 is a cross-sectional view showing an example of a main part of a thermal detection sensor according to the first embodiment, in which a cross section taken along the line E-P in FIG. 5 is shown in the direction of an arrow.

In FIG. 1, a substrate 101, a substrate protective film 102, a supporting film 103, a heating resistor element 104, a first protective film 105, a barrier film 106, a flattened film 107, a second protective film 108, a back surface protective film 109, a cavity 110, a diaphragm structure 111, and an arrow FDDF are exemplified.

As shown in FIG. 1, the thermal detection sensor in the flow state of the fluid to be detected includes the substrate 101 having the cavity 110 opened therein, and the diaphragm structure 111 formed so as to cover the cavity 110 on the surface of the substrate 101.

The substrate 101 is a silicon substrate, and its entire surface is covered with the substrate protective film 102 such as a thermal oxide film. The cavity 110 is formed by removing a part of the substrate 101 and the substrate protective film 102 from the back side of the substrate 101.

In the first embodiment, the diaphragm structure 111 includes the supporting film 103, the heating resistor element 104, the first protective film 105, the barrier film 106, the flattened film 107, and the second protective film 108.

The heating resistor element 104 is also generally called a heat sensitive resistive element.

In addition, the diaphragm structure 111 is also generally called a diaphragm part, or simply a diaphragm.

The diaphragm structure 111 is formed as follows.

An insulating supporting film 103 is formed on the surface of the substrate 101 so that the cavity 110 is opened.

The heating resistor element 104 is formed in a part of the supporting film 103 on the cavity 110.

Then, the first protective film 105 is formed on the heating resistor element 104, and in that case, as viewed in plan view of the first protective film 105, it is formed in the same pattern as the heating resistor element 104.

Then, the barrier film 106 is coated on the supporting film 103 so as to cover the outer circumferential surface of the heating resistor element 104 and the outer circumferential surface and the top surface of the first protective film 105.

Further, the flattened film 107 is formed on the barrier film 106.

Further, the second protective film 108 is formed on the flattened film 107.

The arrow FDDF indicates the flowing direction of the fluid to be detected.

In addition, in the first embodiment, the flow state of the fluid to be detected means the flowing amount of the fluid to be detected, in other words, the fluid flow rate, Also, it means the flowing speed of the fluid to be detected, in other words, the fluid flow velocity, it also means the stop of the flow of the fluid to be detected.

In addition, in the first embodiment, as the heat generating resistor element 104 exchanges heat with the flowing detected fluid, the temperature of the heating resistor element 104 itself changes, a detection sensor for detecting the flow state of the fluid to be detected based on the resistance value of the heating resistor element itself which changes according to the temperature change of the heating resistor element itself, in other words, a thermal detection sensor for detecting the flow state of the fluid to be detected based on the amount of heat transfer from the heating resistor element to the fluid to be detected by heat exchange between the fluid to be detected and the heating resistor element, is also referred to as a thermal type flow rate detection sensor in the present embodiment.

In addition, in the first embodiment, by exchanging heat through the heating resistor element 104 with the flowing detected fluid via the second protective film 108, the flattened film 107, the barrier film 106, and the first protective film 105, the temperature of the heating resistor element 104 itself changes, the flow state of the fluid to be detected is detected based on the resistance value of the heating resistor element itself which changes according to the temperature change of the heating resistor element itself.

Next, a method of manufacturing the thermal detection sensor in the flow state of the fluid to be detected according to the first embodiment will be described.

In FIG. 1, the substrate 101 is made of, for example, a silicon wafer having a thickness of about 400 µm, and the substrate protective film 102 made of an oxide film is formed on the substrate 101.

The insulating supporting film 103 made of silicon nitride (SiN) having a thickness of about 1 µm is formed on the substrate protective film 102 by, for example, a PECVD (Plasma-Enhanced Chemical Vapor Deposition) device. Hereinafter, the silicon nitride will be referred to as SiN.

Here, since the support film 103 is formed so as to be Si-lean, the effect of suppressing the increase in the resistance value of the heating resistor element 104 by silicidation is enhanced. In the example of the present embodiment, the Si-lean film is a SiN film having a refractive index of less than 2.25.

Further, the support film 103 is formed so as to have a stress of 50 to 300 MPa.

Here, the supporting film 103 may be an insulating material that functions as an insulating film and suppresses silicidation, and the material of the supporting film 103 is not particularly limited. As the insulating material of the supporting film 103 functioning as an insulating film and suppressing silicidation, for example, Si-lean SiN, MgO, $Al_2O_3$, DLC (Diamond-Like Carbon), can be mentioned.

The DLC (Diamond-Like Carbon) is an amorphous carbon film composed of an allotrope of carbon and is a generic term for carbon thin film having high hardness and insulating properties similar to diamond, and is formed by a plasma CVD (chemical vapor deposition method), PVD method (physical vapor deposition method).

By forming a film so that the supporting film 103 becomes an insulating film suppressing silicidation, silicidation between the metal as the heating resistor element and Si is suppressed.

Regarding the method for forming the supporting film 103, the supporting film 103 may be any film that satisfies the above requirements, and any film forming device may be used.

Further, by depositing on the supporting film 103, for example, a heat generating resistive film (heat sensitive resistive film) made of platinum (Pt) with a thickness of about 0.1 to 1 µm using a PVD (physical vapor deposition) device; the heating resistor element 104 is formed.

The electric resistance of the metal conductor has a positive temperature coefficient, in which the electric resistance increases in proportion to the temperature. Among them, platinum (Pt) is excellent in linearity, reproducibility, corrosion resistance, and can perform highly sensitive and highly accurate measurement.

However, the heat generating resistive film can be used as a temperature measuring resistor, and is not particularly limited as long as it is a metal material reacting with Si.

As a metal material which reacts with Si, nickel (Ni), molybdenum (Mo), platinum (Pt), tungsten (W), tantalum (Ta), titanium (Ti), aluminum (Al), etc. can be used as the heating resistor element 104.

Regarding the method of forming the heat generating resistive film which is the heat resistor element 104, it is sufficient that the heat generating resistive film satisfies the above requirements, and any film forming device may be used. Further, there is no restriction on the film thickness of the heat generating resistive film, that is, the thickness of the heat resistor element 104.

Further, the first protective film 105 made of SiN is formed on the heating resistive film which is the heating resistor element 104 by using, for example, the aforementioned PECVD device.

Here, when the first protective film 105 is formed so as to be Si-lean, the effect of suppressing the increase in resistance value by silicidation is enhanced. In the example of the present embodiment, the Si-lean film is a SiN film having a refractive index of less than 2.25.

Here, the first protective film 105 may be an insulating material that functions as an insulating film and suppresses silicidation, and the material of the first protective film 105 is not particularly limited. As the insulating material that functions as an insulating film and suppresses silicidation include Si-lean SiN, MgO, $Al_2O_3$, DLC.

By forming the first protective film 105 to be an insulating film suppressing silicidation, silicidation between the metal as the heating resistor element 104 and Si is suppressed.

Regarding the method for forming the first protective film 105, the first protective film 105 may be any film as long as it meets the above requirements, and any film forming device may be used.

Then, a heat treatment at 600° C. to 750° C. is performed on the platinum (Pt) film which is the heating resistive film, the supporting film 103 and the Si-lean SiN film which is the first protective film 105 are formed.

Regarding the formation of the heat generating resistive film and the first protective film 105, patterning is performed using a wet etching method, a dry etching method, whereby a wiring made of the heating resistor element 104 is formed.

Subsequently, in order to cover the entire surface of the support film 103, for example, as described above, the heating resistor element 104 with the first protective film 105 and a current path (not shown, as the current path itself is well-known) the barrier film 106 made of SiN having a thickness of 0.1 μm or more is formed on the entire surface of the support film 103 by using, for example, the PECVD device.

Here, the barrier film 106 can separate the heating resistor element 104 from the flattening film 107 formed in a later step, by forming a film so as to be Si-lean, the effect of suppressing the increase in resistance value by silicidation is enhanced. In the example of the present embodiment, the Si-lean film is a SiN film having a refractive index of less than 2.25.

Further, the barrier film 106 is formed so as to have a stress of 50 to 300 MPa.

The barrier film 106 is formed over the entire area of the boundary between the support film 103 and the flattened film 107. In addition, the barrier film 106 is formed to have a uniform thickness over its entire area.

Here, the barrier film 106 can separate the heating resistor element 104 from the flattened film 107 to be formed in a later step. The material of the barrier film 106 is not particularly limited as long as it is an insulating material that suppresses silicidation. As the insulating material that functions as a barrier film and suppresses silicidation includes Si-lean SiN, MgO, $Al_2O_3$, DLC, etc. by forming a film so that the barrier film 106 becomes an insulating film suppressing silicidation, silicidation between the metal as the heating resistor element and Si is suppressed.

Regarding the film formation method of the barrier film 106, the barrier film 106 may be any film as long as it meets the above requirements, and any film formation device may be used.

Further, the flattened film 107 made of a SOG (Spin On Glass) film (silicon oxide film) having a thickness of about 0.1 to 5 μm is formed on the barrier film 106.

The flattened film 107 is mainly composed of silicon (Si) and oxygen (O), and has a very high fluidity, for example, SOG, Type-12 manufactured by Tokyo Ohka Kogyo Co., Ltd. In this way, by providing the flattened film 107, as shown in FIG. 1, it is possible to reduce steps or irregularities caused by the heating resistor element 104, the first protective film 105, and the barrier film 106, and to smooth the change of the steep steps or the irregularities.

This SOG film solidifies by annealing at about 400° C. or higher.

Further, the second protective film 108 for protecting the surface is deposited on the flattened film 107. Here, as the second protective film 108, for example, a SiN film having a thickness of about 0.8 μm or more is formed by using the aforementioned PECVD device.

Note that the material used for forming the second protective film 108 is not particularly limited as long as it is a material that can be used as a protective film in the technical field of the art. Further, any film forming device may be used.

However, by making the material of the second protective film 108 the same as that of the supporting film 103, the first protective film 105, and the barrier film 106, the same device can be used.

According to this manufacturing method, the barrier film 106 is formed before the flattened film is formed. Stress concentration due to an external force, which is caused by the illustrated step or unevenness occurring in the heating resistor element 104, occurs on the outermost surface of the second protective film 108. Therefore, the barrier film 106 is less susceptible to stress concentration due to external force, and no cracks are generated.

Next, the back surface protective film 109 is formed on the entire back surface of the substrate 101. Then, part of the back surface protective film is removed by dry etching or the like to form etching holes. Thereafter, for example, alkaline etching is performed to remove a part of the substrate 101 and the substrate protective film 102 from the back side of the substrate 101 to the supporting film 103, thereby forming the cavity 110. The cavity 110 is formed corresponding to the lower part of the area where the heating resistor element 104 is formed on the supporting film 103. As a result, the heating resistor element 104 is formed above the cavity 110 in a state of being supported by the supporting film 103, and the diaphragm structure 111 is constructed.

In this embodiment, KOH, TMAH (Tetra Methyl Ammonium Hydroxide), NaOH, etc. are used as an etchant.

According to the first embodiment, by forming the barrier film 106 between the heating resistor element 104 and the flattened film 107, the barrier film 106 suppresses physical contact between the heating resistor element 104 and the flattened film 107, it is possible to suppress silicidation of the heating resistor element 104 in a high-temperature environment, for example, in a high-temperature environment in which the thermal detection sensor is used as an in-vehicle device for measuring the amount of intake air to the internal combustion engine.

By using an insulating material that does not cause silicidation for the barrier film 106, silicidation of the heating resistor element 104 occurring at the interface between the heating resistor element 104 and the barrier film 106 can be suppressed.

By suppressing the silicidation of the heating resistor element 104, it is possible to reduce fluctuations in electric resistance of the heating resistor element 104, it is possible to further improve the long-term reliability of the output characteristic of the thermal detection sensor in the flow state of the fluid to be detected.

Here, by making the material of the barrier film 106 the same material as the supporting film 103 which is the main constituent material of the diaphragm structure 111, the coefficient of thermal expansion of the barrier film 106 and the coefficient of thermal expansion of the supporting film 103 become the same, distortion due to heat hardly occurs in the diaphragm structure 111, since the thermal detection sensor shows the same behavior at high temperature, it is easy to control. In addition, since the barrier film 106 and the supporting film 103 can be handled as films exhibiting the same behavior against other external causes, it is possible to manufacture a thermal detection sensor in a stable flow state of a fluid to be detected free of individual differences in precision.

Further, by making the material and stress of the barrier film 106 the same material and stress as those of the supporting film 103 which is the main constituent material of the diaphragm structure 111, the variation in the change due to the stress and the external cause is reduced. Therefore, it is possible to realize a thermal detection sensor in a flow state of a fluid to be detected having a small variation in sensitivity as a diaphragm structure.

As described above, the thermal detection sensor in the flow state of the fluid to be detected in the present embodiment, when performing cost reduction and downsizing, it is possible to provide a thermal detection sensor in a flow state of a fluid to be detected that suppresses resistance variation of the heating resistor element 104 caused by silicidation of the heating resistor element 104.

Second Embodiment

Figure 2:
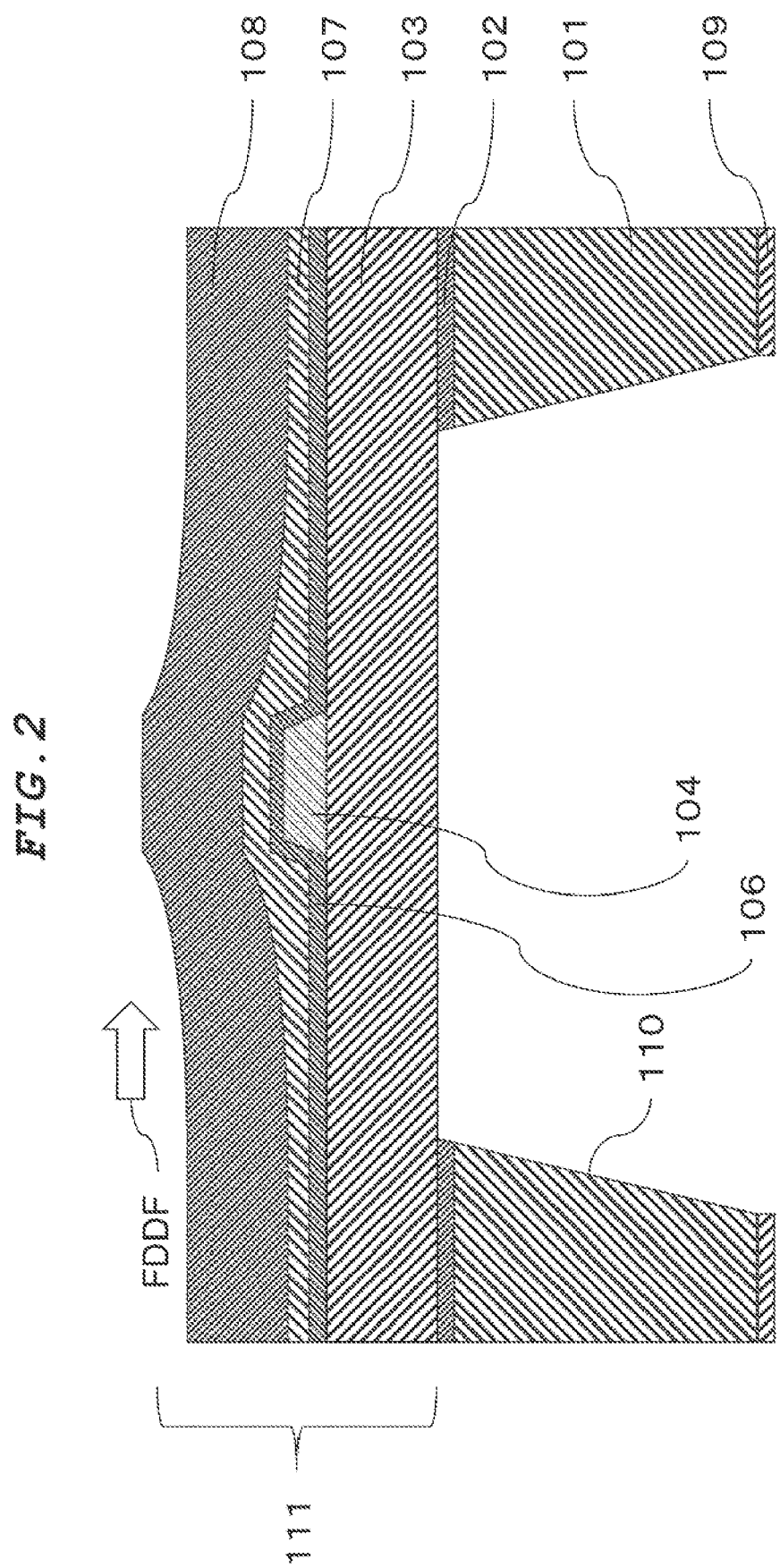
FIG. 2 is a sectional view showing a second embodiment of the present application, showing another example of a main part of a thermal detection sensor for detecting a flow state of a fluid to be detected.

Hereinafter, the second embodiment will be mainly described with reference to FIG. 2 which is different from the above described first embodiment, and description of the same or corresponding parts as those of the first embodiment will be omitted. FIG. 2 is a cross-sectional view showing an example of a main part of a thermal detection sensor according to the second embodiment, in which a cross section taken along the line E-P in FIG. 5 is shown in the direction of an arrow.

In the above described first embodiment, the thermal type flow rate detection sensor including the first protection film 105 on the heating resistor element 104 is used, whereas in the second embodiment, it is an example of the structure without the first protective film 105 in the first embodiment.

In the structure without the first protective film 105 in the first embodiment, when the barrier film 106 is absent, the contact area between the heating resistor element 104 which is a metal and the flattened film 107 is increased. As the contact area increases, the influence of resistance value fluctuation of the heating resistor element 104 caused by silicidation of the heating resistor element 104 in a high-temperature environment occurring at the interface between the metal as the heating resistor element 104 and the flattened film 107 is growing. Even in such a case, by forming the barrier film 106 interposed between the flattened film 107 and the heating resistor element 104 which is a metal, it is possible to suppress the resistance value variation of the heating resistor element 104 caused by silicidation of the heating resistor element 104 in a high temperature environment. The resistance value variation suppressing effect is enhanced.

In the above described first embodiment, the case where the structure including the first protective film 105 on the heating resistor element 104 is described, but as in the second embodiment, it can be similarly implemented even in the case where the first protective film 105 is not provided in the first embodiment.

It goes without saying that the thermal type flow rate detection sensor which does not use the first protective film in the second embodiment also has the same effect as in the first embodiment.

Further, as compared with the case where the first protective film 105 is provided as in the above described first embodiment, the effect of suppressing an increase in the resistance value of the heating resistor element 104 caused by silicidation of the heating resistor element 104 in a high temperature environment is enhanced.

Third Embodiment

Figure 3:
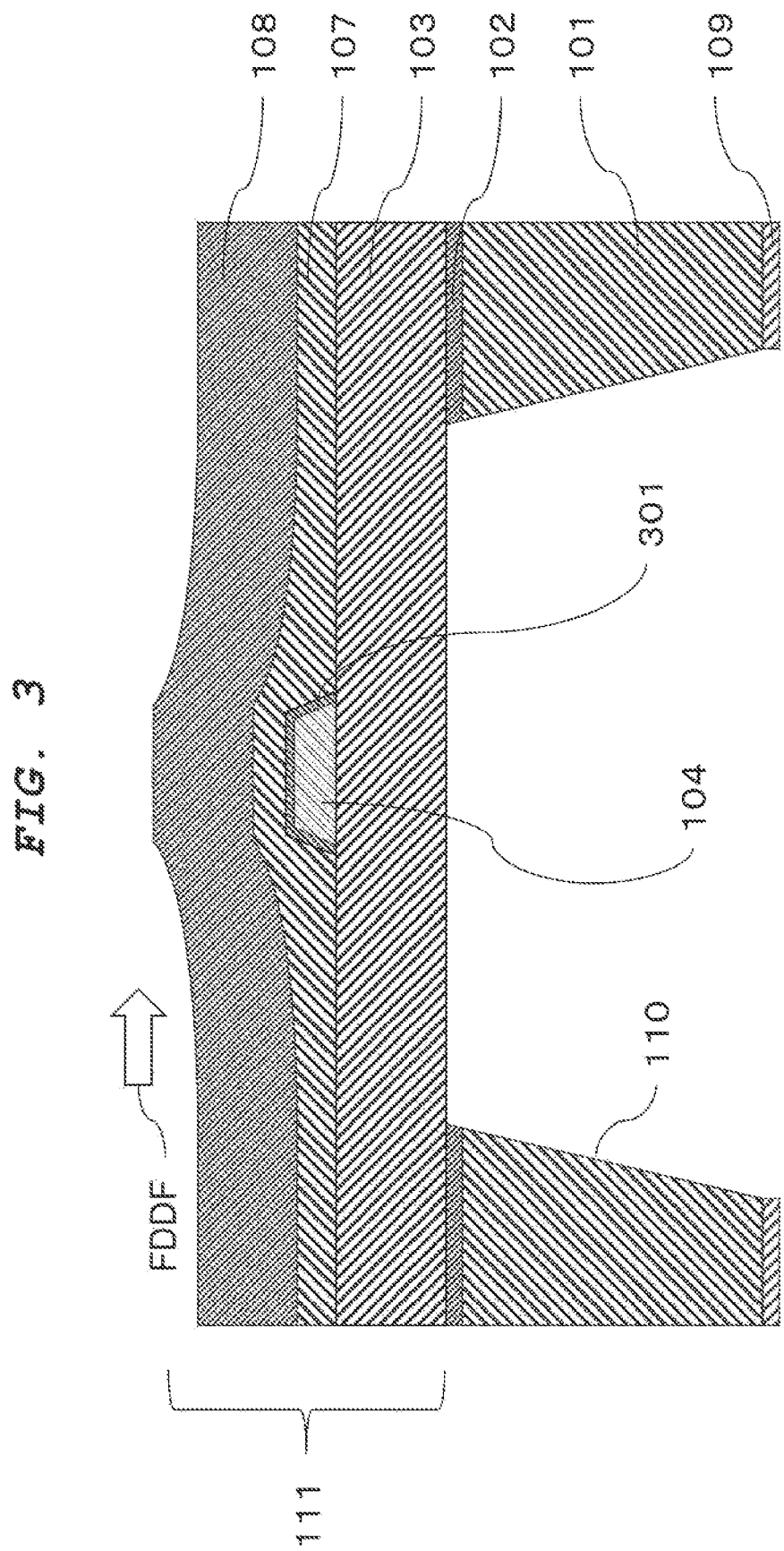
FIG. 3 is a sectional view showing a third embodiment of the present application, showing still another example of a main part of a thermal detection sensor for detecting a flow state of a fluid to be detected.

Hereinafter, the third embodiment will be mainly described with reference to FIG. 3 which is different from the above described first embodiment and second embodiment, and description of the same or corresponding parts as those of the first embodiment and second embodiment will be omitted. FIG. 3 is a cross-sectional view showing an example of a main part of a thermal detection sensor according to the third embodiment, in which a cross section taken along the line E-P in FIG. 5 is shown in the direction of an arrow.

In the above described first embodiment, the case where the barrier film 106 has a structure in which the barrier film 106 is coated on the supporting film 103 so as to cover the heating resistor element 104 and the first protective film 105 has been described, and in the second embodiment, the case where the barrier film 106 has a structure in which the barrier film 106 is covered on the supporting film 103 so as to cover the heating resistor element 104 has been described, however, in the third embodiment, the surface of the heating resistor element 104 is surface modified so that a layer of the oxide film 301 is formed on the surface of the heating resistor element 104.

In FIG. 3, the thermal detection sensor includes the substrate 101 having the cavity 110 opened therein, and the diaphragm structure 111 formed so as to cover the cavity 110 on the surface of the substrate 101.

The substrate 101 is in silicon and its entire surface is covered with the substrate protective film 102 such as a thermal oxide film. The cavity 110 is formed by removing a part of the substrate 101 and the substrate protective film 102 from the back side of the substrate 101.

The insulating supporting film 103 constituting the diaphragm structure 111 is formed on the surface of the substrate 101 so as to close the top surface of the cavity 110.

The heat resistor element 104 is patterned in a shape exemplified in FIG. 5 on a central part of the supporting film 103 corresponding to a top surface of the cavity 110 and on a surface opposite to the cavity 110.

The entire surface of the heating resistor element 104 except the interface with the supporting film 103, in other words, on the top surface and the peripheral surface, the layer of the oxide film 301 is formed by surface modification. Further, the flattened film 107 is formed so as to cover the surface of the support film 103 so as to cover the upper surface of the heating resistor element 104 having the oxide film 301 formed on at least the entire surface by the surface modification.

Further, the second protective film 108 is formed on the flattened film 107. The surface of the second protective film 108 is the wall surface of the flow path of the fluid to be detected. The fluid to be detected flows in the direction of the arrow FDDF while touching the surface of the second protective film 108, in other words, the upper surface in the figure. The fluid to be detected which flows in the direction of the arrow FDDF exchanges heat with the heating resistor element 104 via the second protective film 108, the flattened film 107, and the oxide film 301.

Next, a method of manufacturing the flow rate detection sensor according to the third embodiment will be described.

In FIG. 3, the substrate 101 is made of, for example, a silicon wafer having a thickness of about 400 μm, and a substrate protective film 102 made of an oxide film is formed on the substrate 101.

An insulating supporting film 103 made of silicon nitride (SiN) having a thickness of about 1 μm is formed on the substrate protective film 102 by, for example the above-mentioned PECVD device. Hereinafter, the silicon nitride will be referred to as SiN.

Here, when the supporting film 103 is formed so as to be Si-lean, the effect of suppressing the increase in resistance value by silicidation is enhanced. In the example of the present embodiment, the Si-lean film means SiN film having a refractive index of less than 2.25.

Here, the supporting film 103 may be an insulating material that functions as an insulating film and suppresses silicidation, and the material of the supporting film 103 is not particularly limited. As the insulating material of the supporting film 103 functioning as an insulating film and suppressing silicidation, Si-lean SiN, MgO, $Al_2O_3$, DLC, can be mentioned. By forming a film so that the supporting film 103 becomes an insulating film suppressing silicidation, silicidation between the metal as the heating resistor element and Si is suppressed.

Regarding the method for forming the supporting film 103, the supporting film 103 may be any film that satisfies the above requirements, and any film forming device may be used.

Further, on the supporting film 103, for example, using a PVD device as described above, a heat generating resistive film made of molybdenum (Mo) having a thickness of about 0.1 to 1.5 μm is deposited and a heating resistor element 104 is inserted.

Here, the heating resistor element 104, which is a heat generating resistive film, is not particularly limited as long as it is a metal material which forms a layer of an oxide film on at least the surface by surface modification.

Examples of the metal material for forming an oxide film on the surface by surface modification include aluminum (Al), titanium (Ti), tantalum (Ta), molybdenum (Mo), etc.

In addition, regarding the method for film forming, any film that satisfies the above requirements, and any film forming device may be used. Further, there is no restriction on the film thickness of the heat generating resistive film, that is, the thickness of the heat resistor element 104.

Regarding the formation of the heat generating resistive film, patterning is performed using a wet etching method, a dry etching method, whereby a wiring made of the heating resistor element 104 is formed.

Further, the metal surface of the heating resistor element 104 is surface-modified by a high temperature treatment in an oxygen atmosphere to form the layer of the oxide film 301. The oxide film can be obtained by heat treatment in the oxygen atmosphere, for example, in the case of molybdenum (Mo), the temperature is 400 to 600° C., 200 to 300° C. in the case of aluminum (Al), 300 to 700° C. in the case of titanium (Ti), 600 to 700° C. in the case of Tantalum (Ta).

Here, as for the surface modification method, any method may be used as long as it is a method of surface modification of the metal surface, and oxygen plasma treatment, ion implantation treatment, etc. can be used.

Further, the flattened film 107 made of an SOG film having a thickness of about 0.1 to 1 μm is formed on the heating resistor element 104 having the layer of the oxide film 301. The flattened film 107 is mainly composed of silicon (Si) and oxygen (O), and has a very high fluidity, for example, SOG, Type-12 manufactured by Tokyo Ohka Kogyo Co., Ltd. In this way, by providing the flattened film 107, as shown in FIG. 3, it is possible to reduce steps or irregularities caused by the heating resistor element 104, and to smooth the change of the steep steps or the irregularities.

In addition, this SOG film solidifies by annealing at about 400° C. or higher.

Further, the second protective film 108 for protecting the surface is deposited on the flattened film 107. Here, as the second protective film 108, for example, a SiN film having a thickness of about 0.8 μm or more is formed by using the aforementioned PECVD device.

Note that the material used for forming the second protective film 108 is not particularly limited as long as it is a material that can be used as a protective film in the technical field of the art. Further, any film forming device may be used.

Next, the back surface protective film 109 is formed on the entire back surface of the substrate 101. Then, part of the back surface protective film is removed by dry etching or the like to form etching holes. Thereafter, for example, alkaline etching is performed to remove a part of the substrate 101 and the substrate protective film 102 from the back side of the substrate 101 to the supporting film 103, thereby forming the cavity 110. The cavity 110 is formed corresponding to the lower part of the area where the heating resistor element 104 is formed on the supporting film 103. As a result, the heating resistor element 104 is formed above the cavity 110 in a state of being supported by the supporting film 103, and the diaphragm structure 111 is constructed.

Here, for example, KOH, TMAH (Tetra Methyl Ammonium Hydroxide), NaOH, etc. are used as an etchant.

According to the third embodiment, since the oxide film 301 formed on the metal surface of the heating resistor element 104, which is present at the interface between the heating resistor element 104 and the flattened film 107, has a barrier function, the oxide film 301 suppresses physical contact between the heating resistor element 104 and the flattened film 107 and suppresses silicidation of the heating resistor element 104 in a high temperature environment. Further, by forming the oxide film on the surface of the heating resistor element 104 by modifying the surface of the heating resistor element 104, it is not necessary to add a new film.

Silicide formation occurring at the interface between the heating resistor element 104 and the flattened film 107 is suppressed by the oxide film formed by modifying the surface of the heating resistor element 104, the resistance value variation of the heating resistor element 104 caused by the silicidation can be reduced, therefore, it is possible to further improve the long-term reliability of the output characteristics of the flow rate sensor.

As described above, in the thermal type flow rate detection sensor according to the third embodiment, when cost reduction and downsizing are performed, it is possible to provide a thermal type flow sensor that suppresses resistance variation caused by silicidation.

Fourth Embodiment

Figure 4:
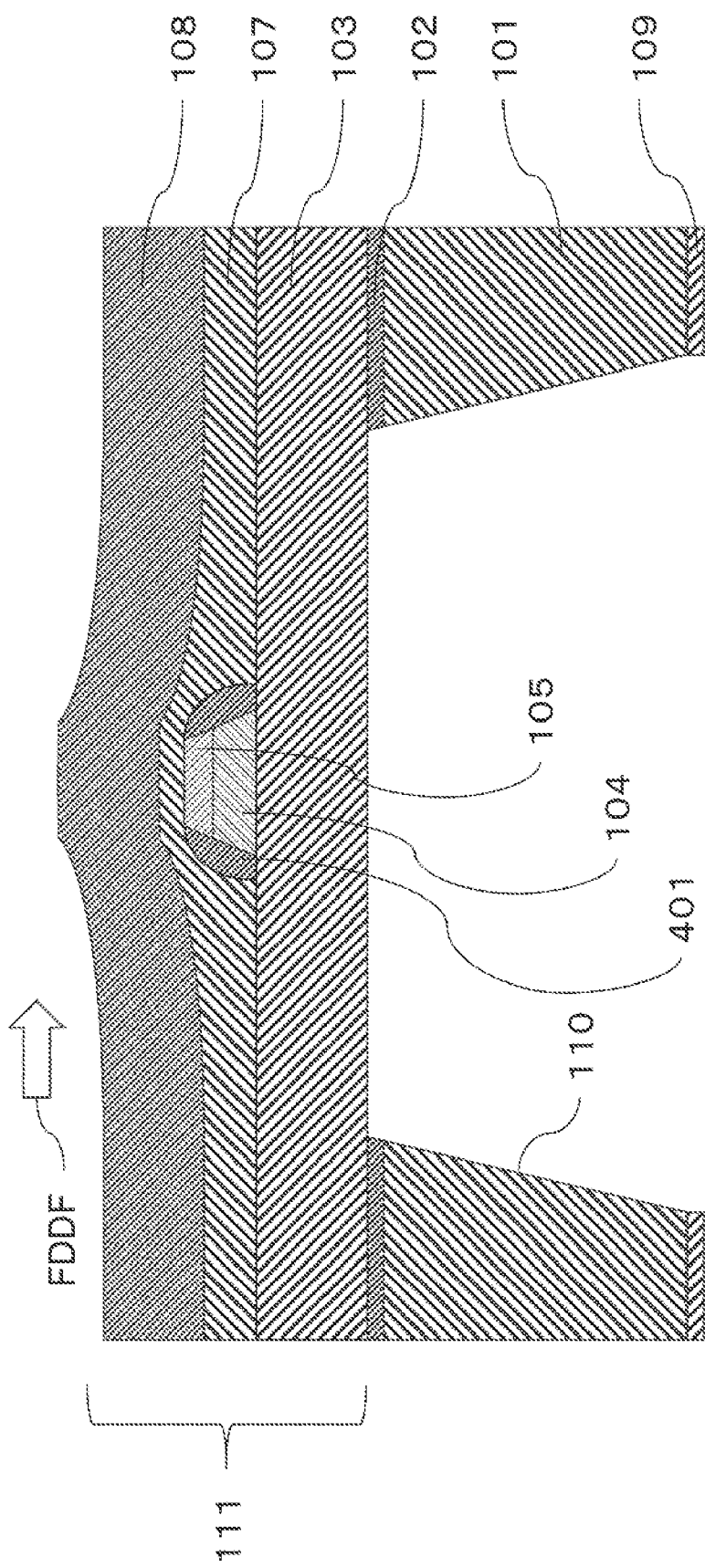
FIG. 4 is a cross-sectional view showing a fourth embodiment of the present application, showing still another example of a main part of a thermal detection sensor for detecting a flow state of a fluid to be detected.

Hereinafter, the fourth embodiment will be mainly described with reference to FIG. 4 which is different from the above described first embodiment to third embodiment, and description of the same or corresponding parts as those of the first embodiment to third embodiment will be omitted. FIG. 4 is a cross-sectional view showing an example of a main part of a thermal detection sensor according to the fourth embodiment, in which a cross section taken along the line E-P in FIG. 5 is shown in the direction of an arrow.

For example, in the above described first embodiment, the thermal type flow rate sensor provided with the barrier film 106 formed on the entire surface of the thermal type flow rate detection sensor is used, in the fourth embodiment, as a structure for suppressing silicidation of the heating resistor element 104, and has a structure of a sidewall 401 that covers only the sidewall (wall surfaces on both sides) of the heating resistor element 104. By adopting the structure of the sidewall 401, it is possible to suppress variation in the resistance value of the heating resistor element 104 caused by silicidation of the heating resistor element 104 in a high-temperature environment as in the first embodiment.

Here, the structure of the sidewall covering only the sidewall (wall surfaces on both sides) of the heating resistor element 104 is the sidewall structure exemplified in FIG. 4. In other words, in the first and second embodiments as illustrated in FIGS. 1 and 2, the barrier film 106 has a structure in which the barrier film 106 covers the entire other area excluding the interface area with the heating resistor element 104 on the upper surface of the supporting film 103. In contrast to the structure illustrated in FIGS. 1 and 2, in the fourth embodiment, as exemplified in FIG. 4, the sidewall 401 does not cover the entire area other than the interface area with the heating resistor element 104 on the upper surface of the supporting film 103 and the area very close to the interface area, and the sidewall 401 blocks the contact between the heating resistor element 104 and the flattened film 107, and covers the sidewall of the heating resistor element 104 and the sidewall of the first protective film 105.

Other configurations are the same as in the first embodiment.

In the fourth embodiment, the sidewall 401 is extended without providing the first protective film 105, by covering the top surface of the heating resistor element 104 at the extended part, it may be configured as to intercept contact between the top surface of the heating resistor element 104 and the flattened film 107 depending on the extended part.

Next, a method of manufacturing the flow rate detection sensor according to the fourth embodiment will be described.

In FIG. 4, the substrate 101 is made of, for example, a silicon wafer having a thickness of about 400 μm, and a substrate protective film 102 made of an oxide film is formed on the substrate 101. An insulating supporting film 103 made of silicon nitride (SiN) having a thickness of about 1 μm is formed on the substrate protective film 102 by, for example the above-mentioned PECVD device. Hereinafter, the silicon nitride will be referred to as SiN.

Here, by forming the support film 103 so as to be Si-lean, the effect of suppressing the increase in the resistance value of the heating resistor element 104 by silicidation of the heating resistor element 104 is enhanced. In the example of the present embodiment, the Si-lean film is a SiN film having a refractive index of less than 2.25.

Here, the supporting film 103 may be an insulating material that functions as an insulating film and suppresses silicidation, and the material of the supporting film 103 is not particularly limited. As the insulating material of the supporting film 103 functioning as an insulating film and suppressing silicidation, Si-lean SiN, MgO, $Al_2O_3$, the above-mentioned DLC, can be mentioned. By forming a film so that the supporting film 103 becomes an insulating film suppressing silicidation, silicidation between the metal as the heating resistor element and Si is suppressed.

Regarding the method for forming the supporting film 103, the supporting film 103 may be any film that satisfies the above requirements, and any film forming device may be used.

Further, a heat generating resistive film (thermal resistance) made of titanium (Ti) having a thickness of about 0.1 to 1 μm is deposited on the supporting film 103 by using, for example, the aforementioned PVD device.

However, the heat generating resistive film can be used as a temperature measuring resistor, and is not particularly limited as long as it is a metal material reacting with Si.

The metal material which reacts with Si, nickel (Ni), molybdenum (Mo), platinum (Pt), tungsten (W), tantalum (Ta), titanium (Ti), aluminum (Al), etc. can be used as the heating resistor element 104.

In addition, regarding the method for film forming, any film formation method satisfying the above requirements may be used, and any film forming device may be used. Further, there is no restriction on the film thickness of the heat generating resistive film, that is, the thickness of the heat resistor element 104.

Further, a first protective film 105 made of SiN is formed on the heating resistive film by using, for example, the aforementioned PECVD device.

Here, by forming the first protective film 105 so as to be Si-lean, the effect of suppressing the increase in the resistance value of the heating resistor element 104 by silicidation of the heating resistor element 104 is enhanced. In the example of the present embodiment, the Si-lean film is a SiN film having a refractive index of less than 2.25.

Here, the first protective film 105 may be an insulating material that functions as an insulating film and suppresses silicidation, and the material of the first protective film 105 is not particularly limited. As the insulating material that functions as an insulating film and suppresses silicidation include Si-lean SiN, MgO, $Al_2O_3$, DLC. By forming the first protective film 105 to be an insulating film suppressing silicidation, silicidation between the metal as the heating resistor element 104 and Si is suppressed.

Regarding the method for forming the first protective film 105, the first protective film 105 may be any film as long as it meets the above requirements, and any film forming device may be used.

Then, a heat treatment at 600° C. to 750° C. is performed on the substrate 101 on which the titanium (Ti) film which is the heating resistor element 104, the supporting film 103 and the Si-lean SiN film which is the first protective film 105 are formed.

Regarding the formation of the heat generating resistive film which is the heating resistor element 104 and the first protective film 105, patterning is performed using a wet etching method, a dry etching method, whereby a wiring made of the heating resistor element 104 is formed.

Next, in order to cover the heating resistor element 104 covered with the first protective film 105 and the current path, a SiN having a thickness of 0.1 μm or more is formed over the entire surface of the support film 103, for example, using the above-mentioned PECVD device.

Then, by dry etching, anisotropic etching of the RIE method (reactive ion etching) is performed to etch back to form the sidewall 401.

Here, the sidewall 401 can separate the heating resistor element 104 and the flattening film 107 formed in a later step. By forming the sidewall 401 so as to be Si-lean, the effect of suppressing an increase in the resistance value of the heating resistor element 104 due to silicidation of the heating resistor element 104 is enhanced. In the example of the present embodiment, the Si-lean film is a SiN film having a refractive index of less than 2.25.

Here, the sidewall 401 can separate the heating resistor element 104 from the flattened film 107 to be formed in a later step. In addition, the sidewall 401 may be an insulating material that suppresses silicidation, and the material of the sidewall 401 is not particularly limited. The insulating material of the sidewall 401 such that the physical contact between the heat generating resistor element 104 and the flattened film 107 made of SOG is blocked and the silicidation is suppressed or prevented exemplarily include Si-lean SiN, MgO, $Al_2O_3$, DLC, etc.

By forming the sidewall 401 to be an insulating film for suppressing or preventing silicidation, it is possible to suppress or prevent the silicidation of the metal serving as the heating resistor element 104 and Si.

In addition, regarding the method for film forming of the sidewall 401, any film that satisfies the above requirements, and any film forming device may be used.

The subsequent steps can be carried out in the same manner as in the first embodiment and the second embodiment.

According to this manufacturing method, the sidewall 401 is formed before the flattened film is formed. Stress concentration due to an external force, which is caused by the illustrated step or unevenness occurring in the heating resistor element 104, occurs on the outermost surface of the second protective film 108. Therefore, the sidewall 401 is less susceptible to stress concentration due to external force, and no cracks are generated.

Regarding the sidewall 401 covering only the sidewall of the heating resistor element 104 in the fourth embodiment, it goes without saying that there is the same effect as in the first embodiment.

Further, since the sidewall 401 covers only the sidewall of the heating resistor element 104, it is not affected by the stress of the barrier film 106 (see the first and second embodiments). Therefore, the degree of freedom of device design such as material selection is improved.

Next, with reference to FIG. 9, the result of evaluating the suppression of the resistance value fluctuation (drift) of the heating resistor element 104 will be described. In the test sample of the present application, the flow rate detection sensor of the first embodiment of the present application was used as a sample.

Figure 7:
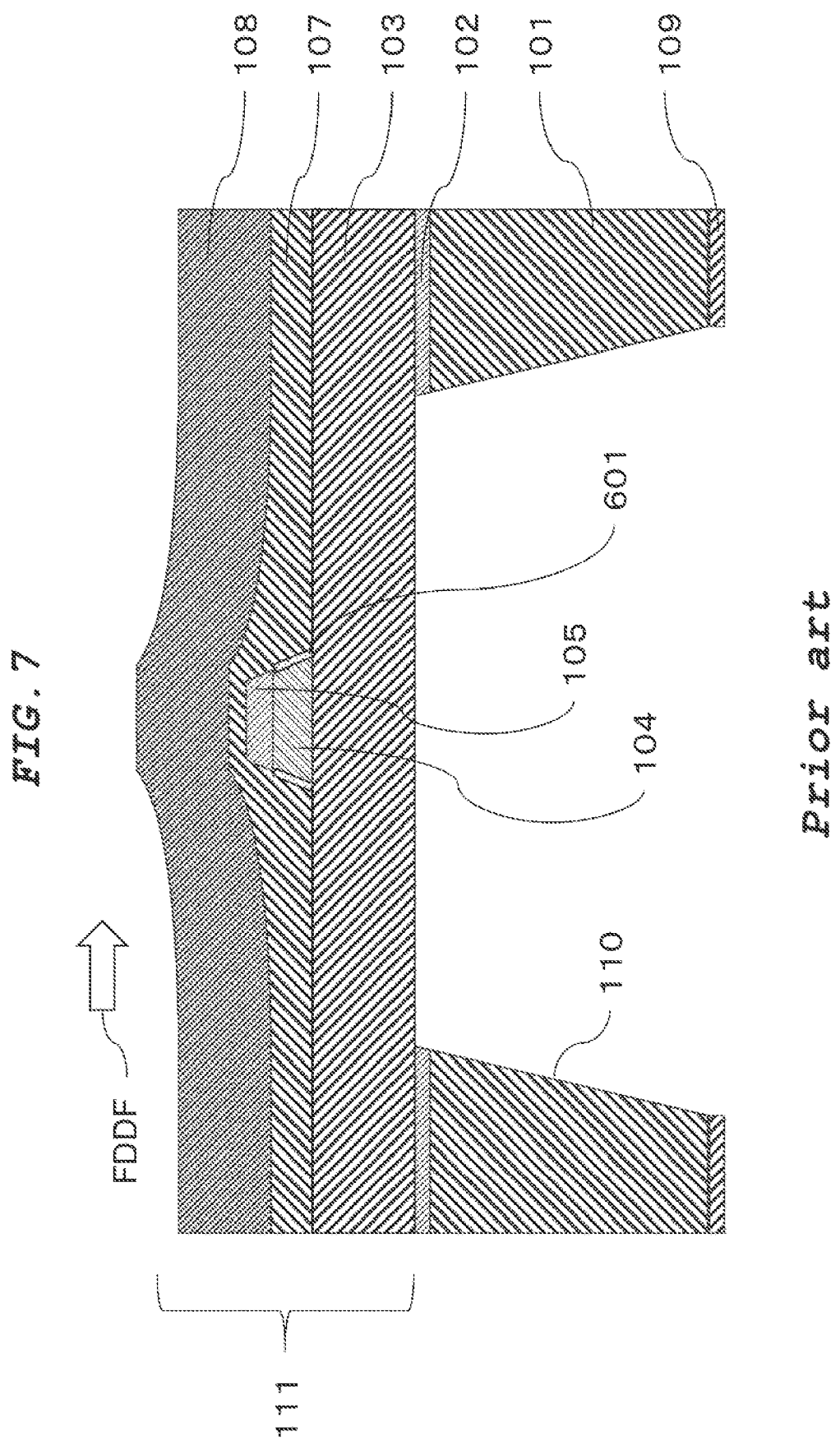
FIG. 7 is a cross-sectional view showing a main part of a conventional downsized thermal detection sensor which is a comparative sample 1.

On the other hand, as a comparative example of a conventional product for comparison with the test sample of the present application, as shown in FIG. 7, the barrier film is not formed, a first protective film 105 is formed on the top surface of the heating resistor element 104, the flow rate detection sensor in which the metal as the heating resistor element 104 and the flattened film 107 are in contact with each other is the comparative sample-1.

Figure 8:
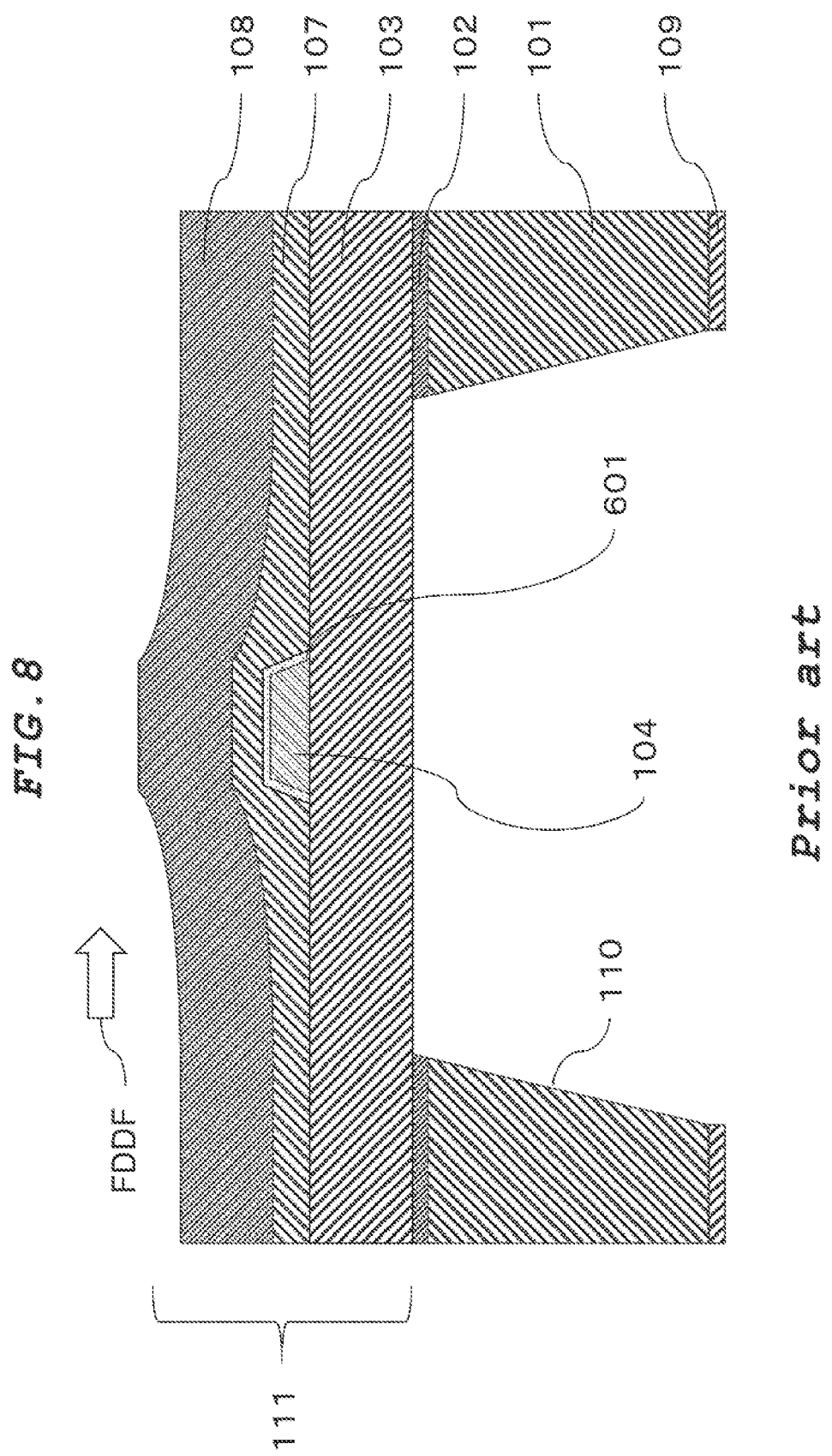
FIG. 8 is a cross-sectional view showing a main part of a conventional thermal detection sensor which is a comparative sample 2.

As a comparative example of a conventional product for comparison with the test sample of the present application, as shown in FIG. 8, the barrier film and the first protective film are not formed, the flow rate detection sensor in which the metal as the heating resistor element 104 and the flattened film 107 are in contact is the comparative example sample 2.

Here, the film of the materials of each of the test sample, comparative sample 1 and comparative sample 2 was formed as the substrate protective film 102 with a thickness of 500 nm, the support film 103 with a thickness of 1.6 μm, the film of the heating resistor element 104 with a thickness of 200 nm, the first protective film 105 with a thickness of 100 nm, the barrier film 106 with a thickness of 100 nm, the flattened film 107 with a thickness of 180 nm, and the second protective film 108 with a thickness of 1.6 μm.

The resistance value of the three kinds of samples thus prepared was measured under predetermined environmental conditions, in other words, in a state where each sample was placed in a fluid to be detected at a constant temperature and at a constant rate.

The main components of test specimens of three specifications are as follows.

Test sample of the present application: with barrier film, with first protective film, without silicide layer 601, Comparative Sample 1: without a barrier film, with a first protective film, with a silicide layer 601, Comparative Sample 2: without a barrier film, without a first protective film, with a silicide layer 601, Further, in order to confirm the long-term reliability, a high-temperature test was conducted in which the constant temperature in the predetermined environmental conditions was set higher than the actual use temperature.

Figure 9:
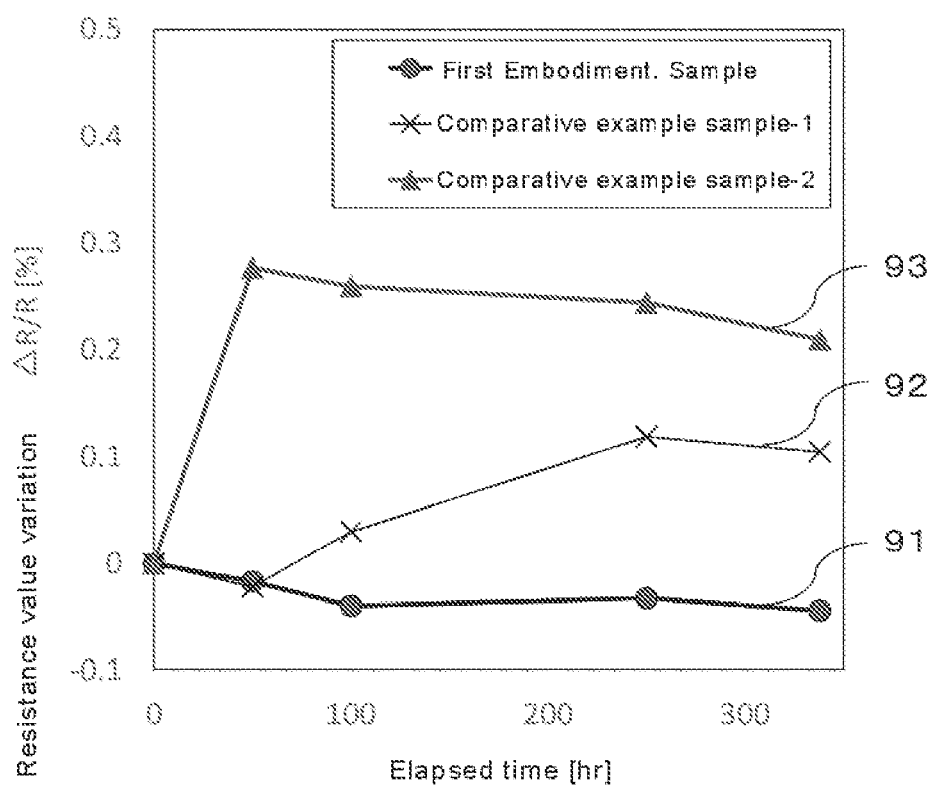
FIG. 9 is a diagram comparing the resistance value fluctuations of each of the first embodiment, the comparative sample 1, and the comparative sample 2.

In FIG. 9, the resistance value of the heating resistor element 104 was measured at four points of time before the test (elapsed time 0) and elapsed time of 50 hr, 100 hr, 250 hr, and 350 hr after the start of the test as illustrated on the horizontal axis in FIG. 9.

The vertical axis in FIG. 9 is $\Delta R/R$ (%) indicating the resistance value variation (drift) of the heating resistor element 104. Here, R is the resistance value of the heating resistor element 104 before the test (elapsed time 0), $\Delta R$ is a deviation between the resistance value of the heating resistor element 104 after the start of the test and the resistance value of the heating resistor element 104 before the test (elapsed time 0).

As a result of comparing the rate of change from the resistance value before the test, as shown in FIG. 9, the resistance value varied by 0.1% or more in comparative sample 1 and comparative sample 2, but in the test sample of the first embodiment, the resistance value hardly changed.

As a result, in comparative sample-1 and comparative sample-2, since the metal as the heating resistor element and the flattened film are in contact with each other, silicidation of the heating resistor element occurs in the above-mentioned test environment, and heat generation, it is confirmed that the resistance value of the heating resistor element increased.

Further, when comparing comparative sample 1 with comparative sample 2, since the resistance value of the heating resistor is higher in comparative sample 2 having a larger contact area between the heating resistor element and the flattened film, the increase in the resistance value of the heating resistor element is related to the contact area between the heating resistor element and the flattened film.

In other words, in the test sample according to the first embodiment, by forming a barrier film at the interface between the heating resistor element and the flattened film, by blocking the contact between the metal as the heating resistor element and the flattened film, it was confirmed that the change in the resistance value of the heating resistor element due to silicidation of the heating resistor element could be suppressed.

In each of the above embodiments of the present application, the thermal type flow rate sensor having the diaphragm structure has been described as an example, the present invention is not limited to each embodiment of the present application, as long as it is a flow sensor comprising a combination of a heating resistor element made of metal and a flattening film, it can be similarly applied, even in that case, there is the same effect as the effect of each embodiment described above.

Further, it is also possible to appropriately change the process apparatus and process conditions.

In the drawings, the same reference numerals indicate the same or corresponding parts.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated.

REFERENCE SIGNS LIST

101: Substrate, 102: Substrate protective film,
103: Supporting film, 104: Heating resistor element,
105: First protective film, 106: Barrier film,
107: Flattened film, 108: Second protective film,
109: Back surface protective film, 110: Cavity,
111: Diaphragm structure, 301: Oxide film, 401: Side wall,
601: Silicide layer.

The invention claimed is:

1. A thermal detection sensor comprising:
an insulating supporting film,
a heating resistor element made of a metal provided on the supporting film, the heating resistor having a top surface and a bottom surface, the bottom surface opposite the top surface, and
a flattened film formed so as to cover the heating resistor element and made of SOG for flattening the step between the supporting film and the heating resistor element on the top surface, the top surface configured on the side of a fluid to be detected, wherein
based on a heat transfer amount from the heating resistor element to the fluid to be detected by heat exchange between the fluid to be detected and the heating resistor element via the flattened film, the thermal type detection sensor is configured to detect a flow state of the fluid to be detected, and wherein
a barrier film for blocking physical contact between the heating resistor element and the flattened film is provided between the heating resistor element and the flattened film, and the barrier film is configured to suppress a variation in electric resistance of the heating resistor element which would otherwise occur due to a silicidation of the heating resistor element.

2. The thermal detection sensor according to claim 1, wherein
a material of the barrier film is the same as a material of the supporting film.

3. The thermal detection sensor according to claim 2, wherein
the stress of the barrier film is the same as the stress of the supporting film.

4. The thermal detection sensor according to claim 3, wherein
the barrier film and the supporting film are all formed of silicon nitride having a refractive index of less than 2.25.

5. The thermal detection sensor of claim 1, wherein:
a protective film is provided between the barrier film and the top surface of the heating element,
the protective film being configured to cover the top surface of the heating resistor element at its own bottom surface,
the barrier film is configured to cover a surface of a side wall of the protective film, a surface of a side wall of the heating resistor element, and a surface of the insulating supporting film,
the barrier film being configured to lay over a top surface of the protective film, the surface of a side wall of the protective film, a surface of the side wall of the heating resistor element, and the surface of the insulating supporting film, and the barrier film, the protective film and the supporting film are all formed of silicon nitride having a refractive index of less than 2.25.

6. A thermal detection sensor comprising:
an insulating supporting film,
a heating resistor element made of a metal provided on the supporting film, and
a flattened film formed so as to cover the heating resistor element and made of SOG for flattening the step between the supporting film and the heating resistor element on its surface on the side of a fluid to be detected, wherein
based on a heat transfer amount from the heating resistor element to the fluid to be detected by heat exchange between the fluid to be detected and the heating resistor element via the flattened film, the thermal type detection sensor is configured to detect a flow state of the fluid to be detected, and wherein
a layer of an oxide film formed by reforming the surface of the heating resistor element is configured to suppress a variation in the electric resistance of the heating resistor which would otherwise occur due to a silicidation of the heating resistor element.

7. The thermal detection sensor according to claim 6, wherein
the supporting film is formed of silicon nitride having a refractive index of less than 2.25.

8. A thermal detection sensor comprising:
an insulating supporting film,
a heating resistor element made of a metal provided on the supporting film, the heating resistor having a top surface and a bottom surface, the bottom surface opposite the top surface, the heating resistor having a first sidewall and a second sidewall, the first sidewall approximately opposite the second sidewall,
a flattened film formed so as to cover the heating resistor element and made of SOG for flattening the step between the supporting film and the heating resistor element on the top surface, the top surface configured on the side of a fluid to be detected,
a barrier film between the first sidewall of the heating resistor element and the flattened film and also between the second sidewall of the heating resistor element and the flattened film,
wherein
based on a heat transfer amount from the heating resistor element to the fluid to be detected by heat exchange between the fluid to be detected and the heating resistor element via the flattened film, the thermal type detection sensor is configured to detect a flow state of the fluid to be detected, and wherein
a third sidewall of the barrier film is configured to cover the first sidewall,
a fourth sidewall of the barrier film is configured to cover the second sidewall, the barrier film including an Si-lean insulating film,
a protective film is provided between the barrier film and the top surface of the heating element,
the barrier film being configured at the first sidewall of the heating resistor element and at the second sidewall of the heating resistor element, to block a physical contact between the heating resistor element and the flattened film, and
the barrier film being configured to suppress a fluctuation in electric resistance of the heating resistor element which would otherwise occur due to a silicidation of the heating resistor element.

9. The thermal detection sensor according to claim 8, wherein
   the supporting film is formed of silicon nitride having a refractive index of less than 2.25.
10. The thermal detection sensor of claim 8, wherein:
   the thermal detection sensor further comprises a protective film between the flattened film and the top surface of the heating element, and
   the protective film, in cooperation with the third sidewall and the fourth sidewall, is configured to suppress the fluctuation in electric resistance of the heating resistor element which would otherwise occur.

\* \* \* \* \*